US008235178B2

(12) United States Patent
Kocher

(10) Patent No.: US 8,235,178 B2
(45) Date of Patent: Aug. 7, 2012

(54) ELEVATOR WITH FRICTIONAL DRIVE

(75) Inventor: Hans Kocher, Udligenswil (CH)

(73) Assignee: Inventio AG, Hergiscoil (CH)

( * ) Notice: Subject to any disclaimer, the term of this patent is extended or adjusted under 35 U.S.C. 154(b) by 870 days.

(21) Appl. No.: 11/752,443

(22) Filed: May 23, 2007

(65) Prior Publication Data

US 2007/0272494 A1 Nov. 29, 2007

(30) Foreign Application Priority Data

May 24, 2006 (EP) .................................... 06114506

(51) Int. Cl.

| | |
|---|---|
| ***B66B 9/00*** | (2006.01) |
| ***B66B 20/00*** | (2006.01) |
| ***F16H 27/02*** | (2006.01) |
| ***B61C 11/00*** | (2006.01) |
| ***E04G 3/28*** | (2006.01) |

(52) U.S. Cl. ............... 187/250; 74/89.2; 105/30; 476/9; 182/141

(58) Field of Classification Search .................. 187/270, 187/350, 358, 359, 364, 366, 369, 250; 104/23.2; 105/30; 476/9; 74/89.2, 89.21, 89.22; 181/141, 181/148, 150; *B66B 9/00, 20/00; F16H 27/02; B61C 11/00*

See application file for complete search history.

(56) References Cited

U.S. PATENT DOCUMENTS

| | | | | |
|---|---|---|---|---|
| 275,080 | A * | 4/1883 | Reiff | 187/369 |
| 1,613,215 | A * | 1/1927 | Albersheim et al. | 187/281 |
| 2,251,958 | A * | 8/1941 | Van De Beek et al. | 379/386 |
| 3,381,541 | A * | 5/1968 | Thireau et al. | 474/93 |
| 3,513,954 | A * | 5/1970 | Popper | 192/41 R |
| 4,375,250 | A * | 3/1983 | Burgdorf | 188/72.2 |
| 4,753,119 | A * | 6/1988 | Kuspert | 74/89.21 |
| 5,464,072 | A * | 11/1995 | Muller | 187/249 |
| 5,636,712 | A * | 6/1997 | Muller et al. | 187/249 |
| 5,713,432 | A * | 2/1998 | Richter et al. | 187/250 |
| 5,769,183 | A * | 6/1998 | Richter et al. | 187/249 |
| 5,964,159 | A * | 10/1999 | Hein | 104/128 |
| 6,357,310 | B1 * | 3/2002 | Blanchet et al. | 74/89.21 |
| 6,619,432 | B1 * | 9/2003 | Yasui | 187/250 |
| 6,666,147 | B1 * | 12/2003 | Minges | 104/128 |
| 6,983,826 | B2 * | 1/2006 | Wake et al. | 187/252 |
| 7,021,510 | B2 * | 4/2006 | Ellingson | 226/172 |
| 7,401,718 | B2 * | 7/2008 | Rowe | 226/182 |

FOREIGN PATENT DOCUMENTS

| | | | |
|---|---|---|---|
| DE | 3523187 | A1 * | 1/1987 |
| DE | 101 40 390 | A1 | 3/2003 |
| EP | 41628 | A2 * | 12/1981 |
| EP | 0 330 809 | A1 | 9/1989 |
| EP | 0 681 984 | A1 | 11/1995 |
| EP | 0 684 204 | A2 | 11/1995 |
| EP | 0 870 718 | A1 | 10/1998 |
| EP | 999168 | A2 * | 5/2000 |
| JP | 03153457 | A * | 7/1991 |
| JP | 2006151610 | A * | 6/2006 |

* cited by examiner

*Primary Examiner* — Emmanuel M Marcelo
*Assistant Examiner* — Stefan Kruer
(74) *Attorney, Agent, or Firm* — Ladas & Parry LLP

(57) ABSTRACT

The invention is an elevator comprising a movable component, a vertical track mounted along an elevator shaft, a driven frictional engagement device for frictional engagement with one side of the track with a coefficient of friction, and a connected support disposed on an opposite side of the track. The frictional engagement device is pivotally mounted on a lever which pivotally supports an effective weight of the movable component whereby the lever makes an angle $\alpha_1$ with the horizontal. The tangent of the angle $\alpha_1$ is less than or equal to the coefficient of friction.

2 Claims, 4 Drawing Sheets

ELEVATOR WITH FRICTIONAL DRIVE

The invention relates to an elevator and, more particularly, to an elevator frictionally driven along a track.

BACKGROUND OF THE INVENTION

A frictionally driven elevator is described in EP-A1-0870718 in which a drive wheel and a support wheel are rotatably mounted on levers which are pivotally attached to a lower yoke of a car frame. A compression spring biases the support wheel towards the drive wheel, thereby clamping a track therebetween. The compression spring provides a constant normal force to ensure that there is sufficient frictional engagement between the drive wheel and the track during all operating conditions. This constant normal force is determined from the critical operating condition when the elevator car is fully loaded and moving upwards at maximum acceleration.

BRIEF DESCRIPTION OF THE INVENTION

An objective of the present invention is to provide alternative ways of clamping the frictional drive to the track. This objective is achieved by an elevator comprising a movable component, such as the elevator car, a vertical track mounted along an elevator shaft, driven frictional engagement means for frictional engagement with one side of the track with a first coefficient of friction, and connected support means disposed on an opposite side of the track. The frictional engagement means is pivotally mounted on at least one first lever which pivotally supports an effective weight of the movable component whereby the first lever makes a first angle with the horizontal. The tangent of the first angle is less than or equal to the first coefficient of friction.

The connection between the driven frictional engagement means and the support means allows the driven frictional engagement means to be self-gripping against the track. This effect is achieved primarily by converting the effective weight of the moving component into normal force acting on the frictional engagement means.

BRIEF DESCRIPTION OF THE DRAWINGS

The present invention is herein described by way of the following specific but illustrative examples, with reference to the accompanying drawings in which.

DETAILED DESCRIPTION OF THE INVENTION

Figure 1:
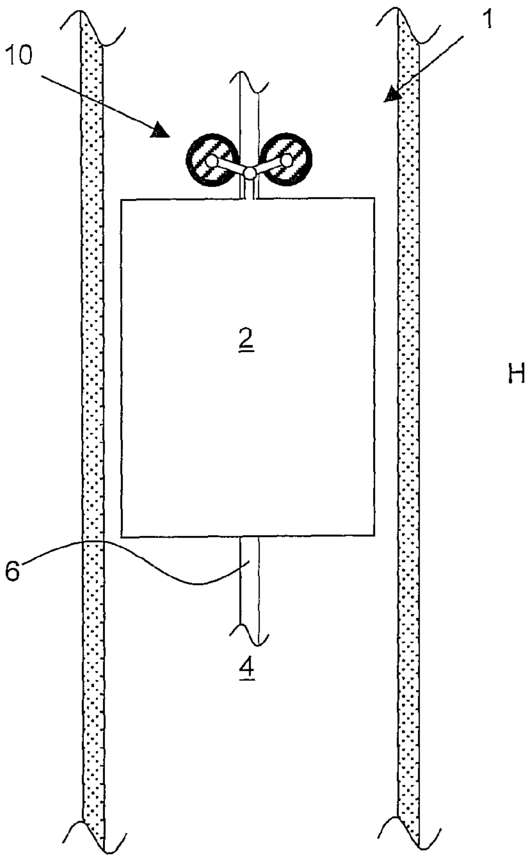
FIG. 1 is a schematic view of an elevator according to a first embodiment of the present invention.
Figure 2:
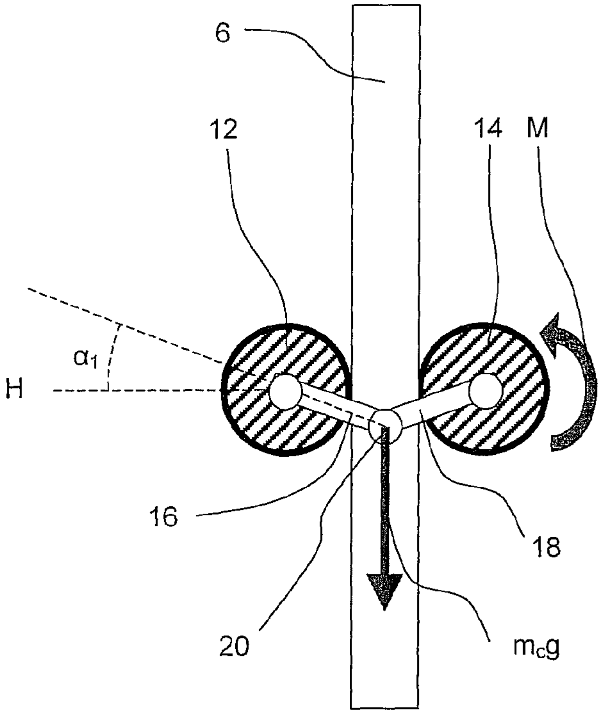
FIG. 2 is a detail view of the frictional drive unit of the elevator of FIG. 1.

A self-propelled elevator 1 according to the invention is shown schematically in FIGS. 1 and 2. The elevator 1 comprises a car 2 which is driven by a frictional drive unit 10 along a vertical track 6 mounted in a shaft 4. The drive unit 10 comprises a pair of driven wheels 12, 14 symmetrically arranged about the track 6 to frictionally engage opposing sides of the track 6. The wheels can be rotated in a conventional manner by one or two motors (not shown). The wheels 12, 14 are rotatably mounted on levers 16, 18 which are interconnected at a hinge 20 from which the car 2 is suspended. Each of the levers is inclined at an angle $\alpha_1$ to the horizontal H.

Figure 3:
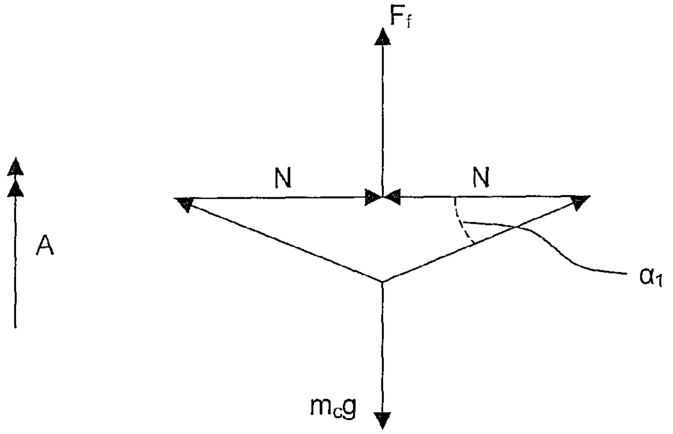
FIG. 3 is a diagram representing the forces acting on the drive unit of FIG. 2.

The forces acting on the frictional drive unit 10 are illustrated in FIG. 3. The total weight of the car $m_c g$ is transmitted through the symmetric levers 16, 18 and into each of the driven wheels 12, 14 which develop equal but opposite normal forces N on opposing sides of the track 6. The total frictional force $F_f$ of the drive unit 10 is a combination of the individual frictional forces and the motive forces M developed by the wheels 14, 16 against the track 6. The difference between the total frictional force $F_f$ and the weight $m_c g$ provides the necessary elevator acceleration A.

To determine an acceptable range for the angle $\alpha$ which ensures that the driven wheels 12, 14 are self-clamping to the track 6 it is necessary to consider the elevator 1 at rest. In this condition, the wheels 12, 14 are stationary; no motive force M is developed by the wheels 12, 14 against the track 6 and therefore the total stationary frictional force $F_{fstat}$ is developed solely from the normal forces N applied to the track 6 from the wheels 12, 14. The stationary frictional force $F_{fstat}$ must be able to counteract the weight $m_c g$ of the car 2 for all loads, otherwise the drive unit 10 will slip. This condition is expressed mathematically in Eqn. 1.

$$F_{fstat} \geqq m_c g \qquad \text{Eqn. 1}$$

However, since the total frictional force $F_{fstat}$ is derived solely from the normal forces $N_1$, the equation can be rewritten in the following sequences:

Eqn. 2:

$$2\mu N \geq m_c g$$

Eqn. 3:

$$\frac{\mu m_c g}{\tan\alpha} \geq m_c g$$

Eqn. 4:

$$\tan\alpha \leq \mu$$

Consider a specific application where the car 2 has a mass of 200 kg and a rated load of 450 kg, the coefficient of friction $\mu_1$, between the track 6 and each of the driven wheels 12, 14 is 0.3, and the maximum elevator acceleration A is 2 m/s$^2$. For self-gripping, the angle $\alpha_1$ must be equal to or less than 16.7° (arctan 0.3) and in this instance is set to 15°.

The maximum normal force $N_{max}$ developed by each of the wheels 12, 14 occurs when the car 2 is fully loaded ($m_{cmax}$=650 kg) and travelling upwards at full acceleration:

$$N_{max} = \tfrac{1}{2} m_{cmax}(g+A)\tan\alpha_1 = 1028N$$

The minimum normal force $N_{min}$ developed by each of the wheels 12, 14 occurs when the car 2 is unloaded ($m_{cmin}$=200 kg) and travelling downwards at full acceleration:

$$N_{min} = \tfrac{1}{2} m_{cmin}(g-A)\tan\alpha_1 209N$$

On the contrary, if the prior art frictional drive of EP-A1-0870718 is used for the same system, the biasing spring must exert constant force equal to the maximum normal force $N_{max}$ (1028N) through the wheels during all operating conditions, which ultimately reduces the lifespan of the wheels.

Figure 4:
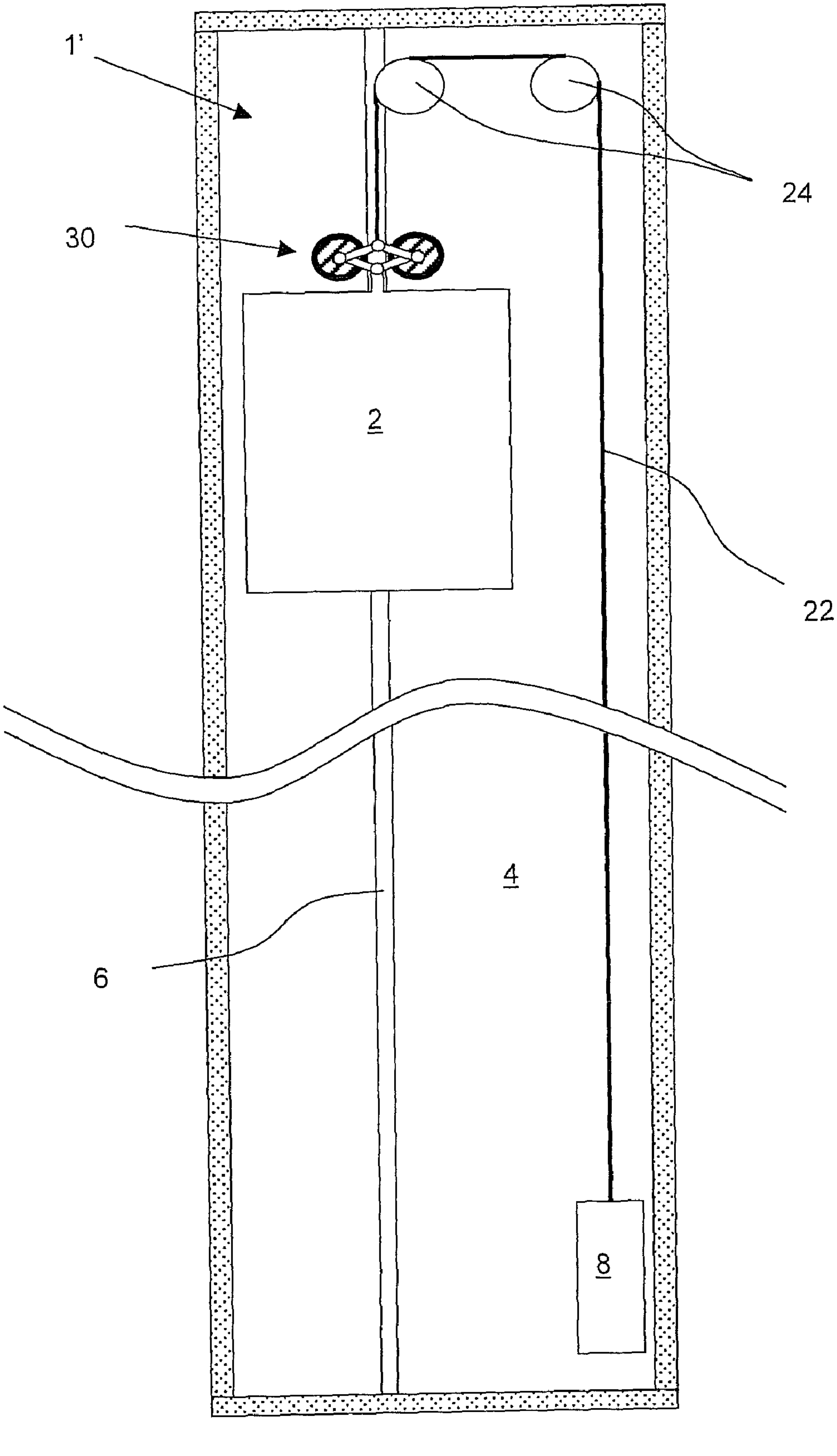
FIG. 4 is a schematic view of an elevator according to a second embodiment of the invention.
Figure 5:
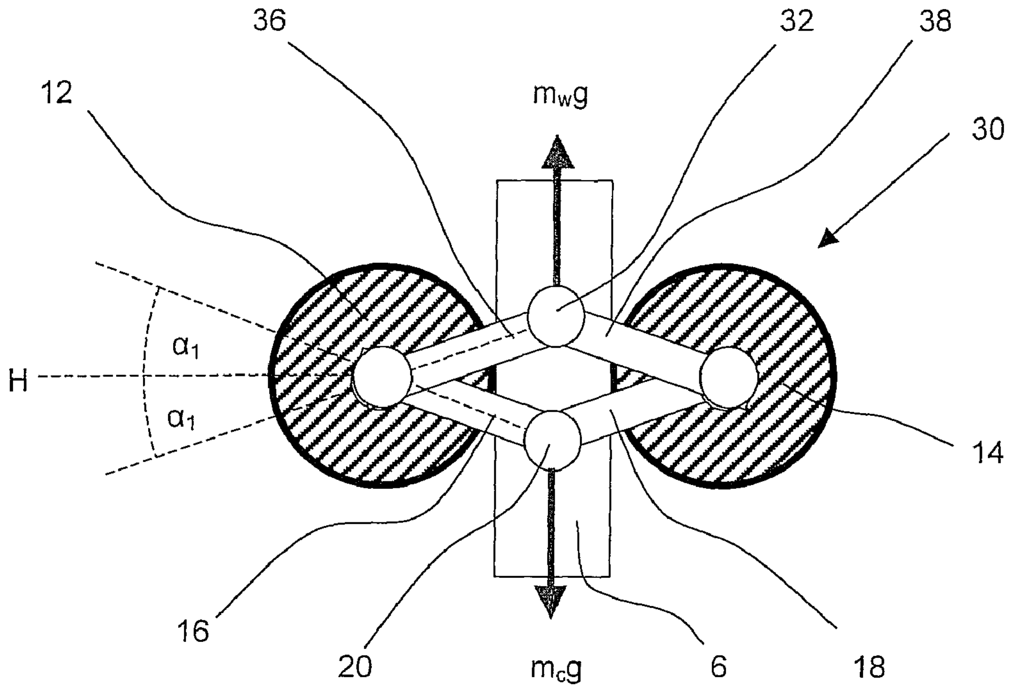
FIG. 5 is a detail view of the frictional drive unit of the elevator of FIG. 4.

FIGS. 4 and 5 illustrate an alternative embodiment of the present invention wherein a frictional drive unit 30 is used to drive a counterbalanced elevator 1'. As in the previous embodiment, the drive unit 30 comprises a pair of driven wheels 12, 14 symmetrically arranged about the track 6 to frictionally engage opposing sides of the track 6. The wheels 12, 14 are rotatably mounted on a first pair of levers 16, 18 which are interconnected at a first hinge 20 from which the car 2 is suspended. Each of the levers 16, 18 is inclined at an angle $\alpha_1$ to the horizontal H. The drive unit 30 also includes a second pair of levers 36,38 arranged symmetrically to the first pair of levers 16, 18 about the horizontal H. The second pair of levers 36,38 is interconnected at a second hinge 32 which is disposed above the first hinge 20. The second hinge 32 is attached by a rope 22 which is deflected over one or more pulleys 24 mounted in the top of the elevator shaft 4 to a counterweight 8.

Using the same parameters from the previous embodiment and assuming the mass of the counterweight $m_w$ is the mass of the car (200 kg) plus half the rated load (225 kg), the maximum normal force $N_{max}$ developed by each of the wheels 12, 14 occurs when the car 2 is fully loaded ($m_{cmax}$=650 kg) and travelling upwards at full acceleration:

$$N_{max}=\tfrac{1}{2}[m_{cmax}(g+A)+m_w(g-A)]\tan\alpha_1=1473N$$

The minimum normal force $N_{min}$ developed by each of the wheels 12, 14 occurs when the car 2 is unloaded ($m_{cmin}$=200 kg) and travelling upwards at full acceleration:

$$N_{min}=\tfrac{1}{2}[m_{cmin}(g+A)+m_w(g-A)]\tan\alpha_1=444N$$

Figure 6:
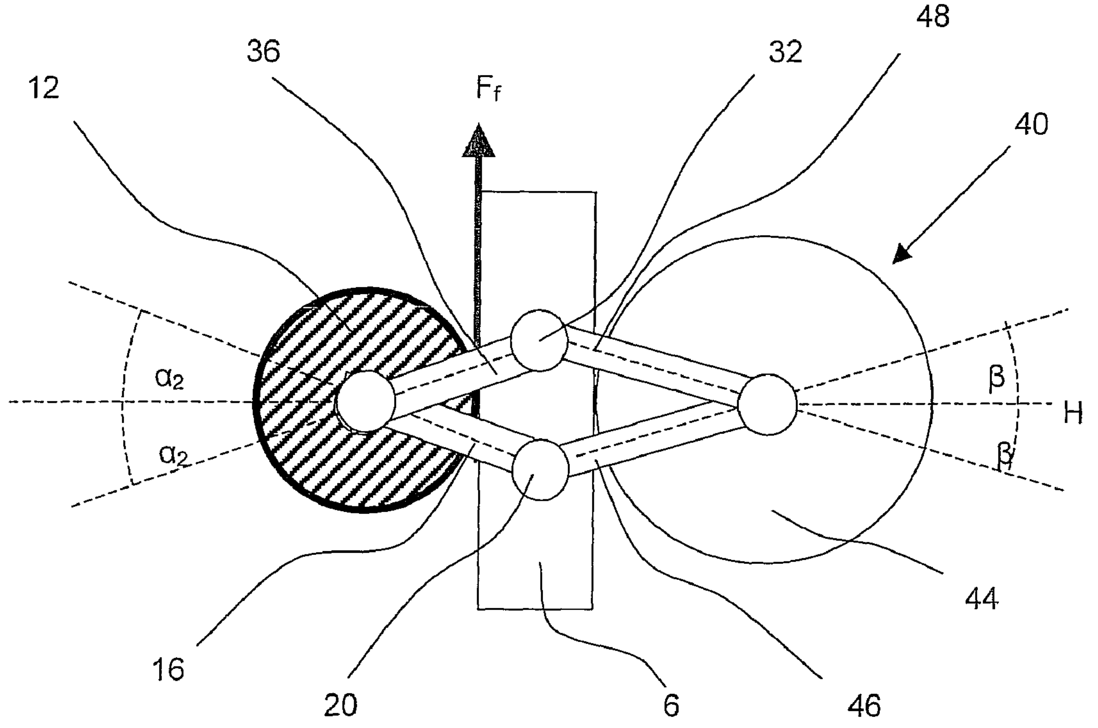
FIG. 6 is a detail view of an alternative frictional drive unit according to a third embodiment of the invention.

FIG. 6 show an alternative frictional drive unit 40 which can be used in the elevator 1 of FIG. 1 or in the counterbalanced elevator 1' of FIG. 4. The drive unit 40 has a similar arrangement to that of FIG. 5 with the exception that a passive support roller 40 replaces one of the driven wheels 12, 14. The single driven wheel 12 is mounted on a lower lever 16 and an upper lever 36 at one side of the track 6. Each of the levers 16, 18 supporting the driven wheel 12 is inclined at an angle $\alpha_2$ to the horizontal H. The passive roller 40 is mounted at the opposing side of the track 6 on a lower support lever 46 and an upper support lever 48. The lower levers 16, 46 are interconnected at a first hinge 20, while the upper levers 36, 48 are interconnected at a second hinge 32.

Since the passive support roll 44 generates no drive frictional force against the track 6, the single driven wheel 12 is responsible for developing the total frictional force $F_f$ for driving, holding and braking the elevator 1 or 1'. Accordingly, equations 1 to 4 need to be modified and the drive unit 40 is self-clamping so long as the following expression is fulfilled:

Eqn. 5:

$$\tan\alpha_2 \le \frac{\mu_1}{2}$$

Hence, if the coefficient of friction $\mu_1$ between the track 6 and the driven wheel 12 is 0.3 as in the previous embodiments, then the angle $\alpha_2$ at which each of the levers 16, 18 supporting the driven wheel 12 is inclined to the horizontal H must be equal to or less than 8.5°. The angle $\beta_1$ at which each of the levers 46,48 supporting the roller 44 is inclined to the horizontal H is not critical, since the support roller 44 generates no drive frictional force against the track 6.

In a typical application, the car 2 is suspended from the first hinge 20 (as in FIGS. 1 and 4) and, if present, a counterweight 8 can be interconnected to the second hinge 32 (as in FIG. 4).

Figure 7A:
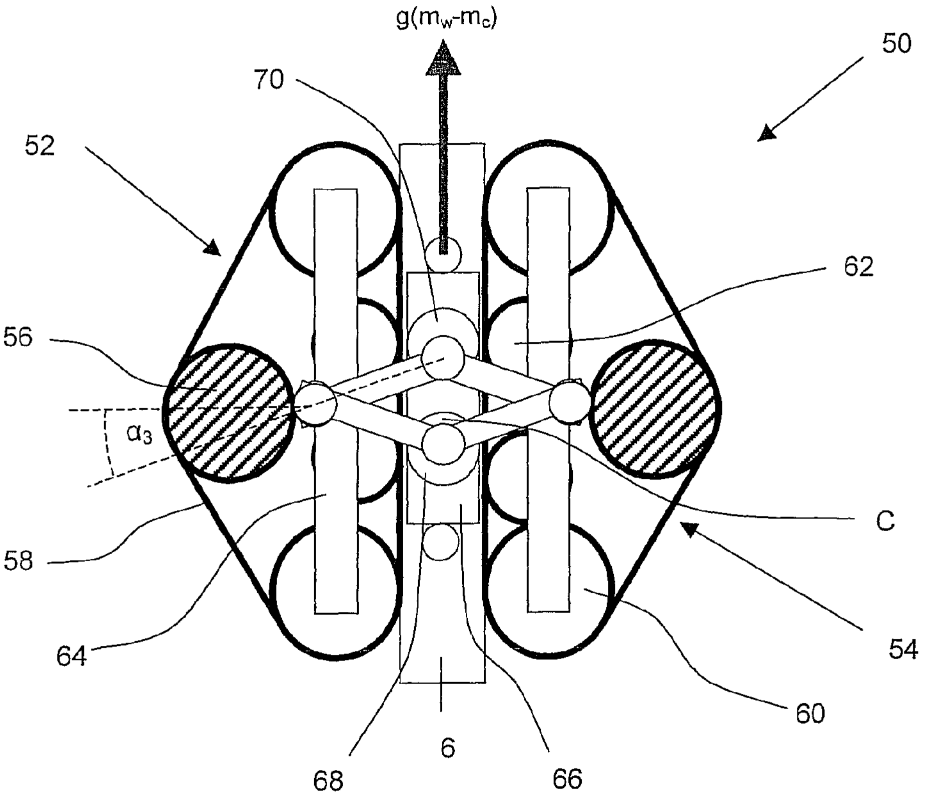
FIGS. 7A to 7C are views of a frictional drive unit according to a fourth embodiment of the invention in different operating conditions.
Figure 7B:
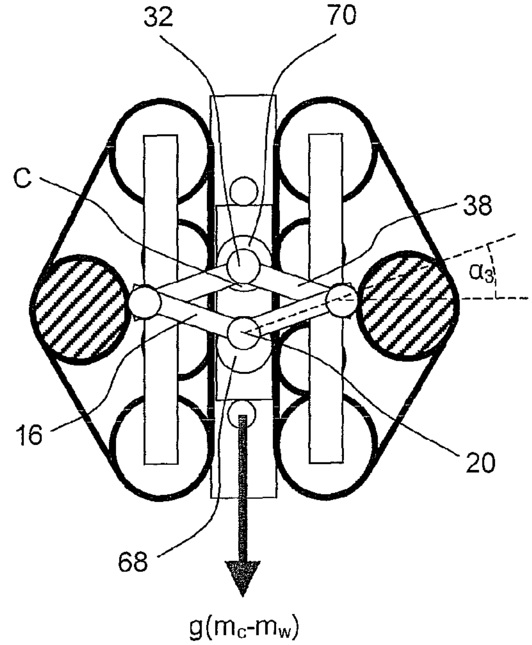
Figure 7C:
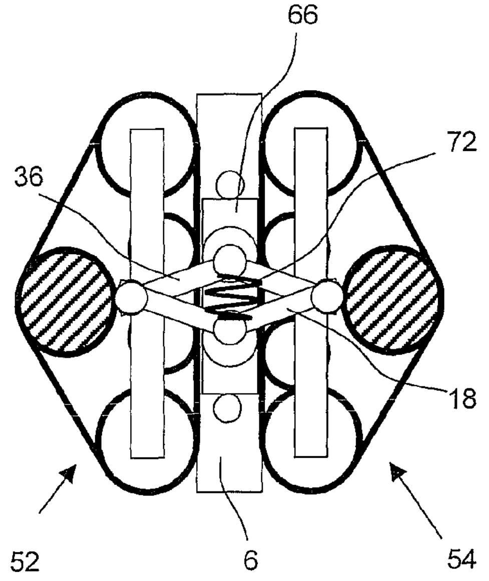

FIGS. 7A to 7C illustrate an alternative frictional drive unit 50 according to the presently preferred embodiment of the invention. The drive unit 50 comprises a pair of belt drives 52,54 symmetrically arranged about the track 6 to frictionally engage opposing sides of the track 6. Each belt drive 52,54 includes a toothed drive wheel 56 which engages with a toothed internal surface of an endless belt 58. The belt 58 passes around a deflection roller 60 to come into engagement with the track 6, along pressing rollers 62 spring biased towards the track, and comes out of engagement with the track 6 at a second deflection roller 60 where it is returned to the drive wheel 56.

The rollers 60,62 are each carried on a retainer 64 which is pivotally mounted on one of a lower lever 16,18 and one of an upper lever 36, 38. The lower levers 16, 18 are interconnected at a first hinge 20 and the upper levers 36, 38 are interconnected at a second hinge 32 arranged vertically above the first hinge 20. Each of the levers 16,18,36,38 is inclined at an angle $\alpha_3$ to the horizontal H. For self-clamping, the angle $\alpha_3$ falls within the range recited in equation 1. As shown specifically in FIG. 7C, a compression spring 72 biases the first hinge 20 and the second hinge 32 apart.

The drive unit 50 is particularly useful in a counterbalanced elevator 1' such as that shown in FIG. 4. However, instead of connecting the car 2 directly to the first hinge 20 and the counterweight rope 22 to the second hinge 32, both the car 2 and the counterweight rope 22 are connected to a connector 66. Accordingly, the effective weight $g(m_w-m_c)$ acting on the connector 66 is the imbalance between the weights of the car 2 and the counterweight 8.

The connector 66 includes a first recess 68 retaining the first hinge 20 and a second recess 70 retaining the second hinge 32. As illustrated in FIG. 7A, when the car 2 is empty, the counterweight 8 is heavier than the car 2 and this imbalance in the respective weights acts as an upwards force $g(m_w-m_c)$ on the connector 66. The connector 66 in turn engages with the second hinge 32 to impart forces through the upper levers 36,38 and the roller retainers 64. These imparted forces are converted by the rollers 60,62 into normal forces pressing the belts 58 into frictional engagement with the respective sides of the track 6. In this situation, the first hinge 20 is loosely retained in its recess 68 and a clearance C between the connector 66 and the first hinge 20 ensures there is no force transmission therethrough.

FIG. 7B illustrates the reverse situation when the car 2 is fully loaded and the weight imbalance acts as a downwards force $g(m_c-m_w)$ on the connector 66. The connector 66 engages with the first hinge 20 to impart forces through the lower levers 16,18 and the roller retainers 64. These imparted forces are converted by the rollers 60,62 into normal forces pressing the belts 58 into frictional engagement with the respective sides of the track 6. During this procedure, the second hinge 32 is loosely retained in its recess 70 and a clearance C between the connector 66 and the second hinge 20 ensures there is no force transmission therethrough.

When the car 2 and the counterweight 8 are balanced and stationary, as shown in FIG. 7C, there is no effective weight acting on the connector 66. The compression spring 72 ensures that the belts 58 remain in engagement with the track 6 by counteracting any weight component of roller retainers 64 or any elasticity in the belts 58 which would otherwise tend to draw the belts 58 away from the track 6. Once, the drive 50 unit commences to move, one of the hinges 20,32 will again come into engagement with the connector 66 and forces will be transmitted through the levers, retainers and rollers to develop normal forces between the belts 58 and the track 6.

Consider a specific application where the car 2 again has a mass of 200 kg and a rated load of 450 kg, the mass of the counterweight $m_w$ is 425 kg, the maximum acceleration A is 2 $m/s^2$ and the coefficient of friction $\mu_3$ between the track 6 and each of the belts 58 is 0.2. For self-gripping, the angle $\alpha_3$ must be equal to or less than 11.3° (arctan 0.2) and in this instance is set to 10°.

The maximum total normal force $N_{max}$ developed by each of the belt drives 52,54 is:

$$N_{max}=\frac{1}{2}(m_c-m_w)(g+A)\tan\alpha_3=234N$$

Assuming that this is distributed evenly over the rollers 60,62, then the normal force per roller 60,62 is only 59N.

The skilled person will readily appreciate that specific elements of any one of the embodiments described above can be substituted with corresponding elements from another embodiment to give a new variant of the invention. For example, any of the driven wheels 12,14 of the embodiments shown in FIG. 2, 5 or 6 can be replaced by a belt drive 52,54 according to FIGS. 7A-7C and vice versa. Similarly, either of the belts drives 52,54 of FIGS. 7A-7C can be substituted with a passive support roller of FIG. 6 provided that the angle $\alpha_3$ is modified accordingly.

I claim:

1. An elevator, comprising a movable component, a vertical track mounted along an elevator shaft, and an elevator drive for driving the movable component, the elevator drive comprising a belt drive unit comprising a plurality of rollers pressing a motor driven belt into frictional engagement with a first side of the track with a first coefficient of friction to drive the movable component along the track and an elevator drive support disposed on a second, opposite side of the track and pivotally mounted for frictional engagement therewith, wherein the belt drive unit is pivotally mounted to the movable component by a single first lever which pivotally supports a weight of the movable component whereby the first lever makes a first angle with a horizontal, the support being pivotally mounted to the movable component by a single second lever that also pivotally supports the weight of the movable component, wherein a tangent of the first angle is less than or equal to the first coefficient of friction, whereby the belt drive unit is pivotally drawn sufficiently into the frictional engagement with the track for the movable component to travel along the track, the first and second levers being interconnected at a first hinge that supports the weight of an elevator car, the support being a second driven belt drive unit.

2. An elevator according to claim 1, wherein the rollers are housed in a retainer and at least one of the rollers is spring biased towards the track.

* * * * *